Patented Jan. 7, 1941

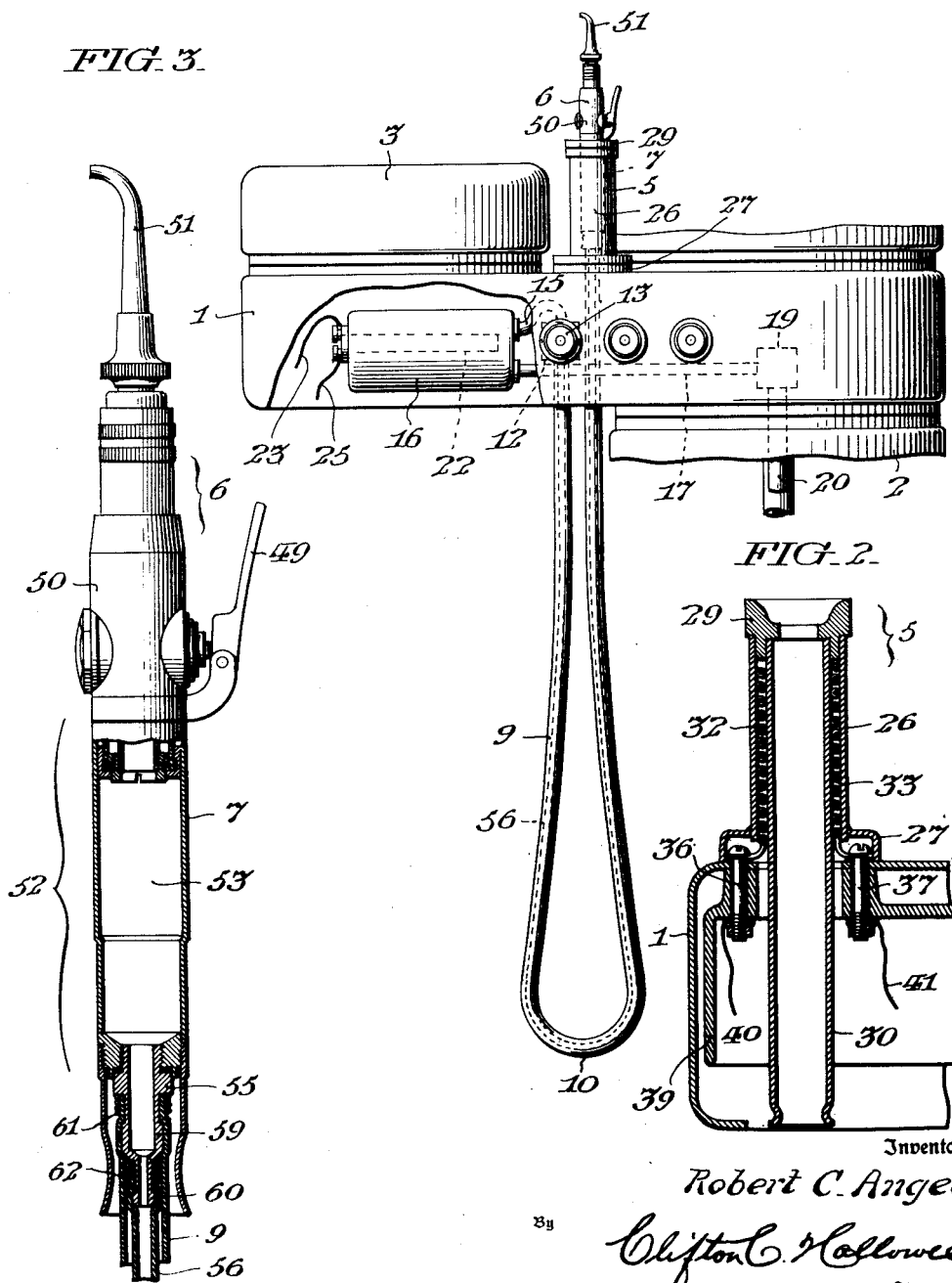

2,227,566

UNITED STATES PATENT OFFICE 2,227,566

WARMING SYSTEM FOR SYRINGES

Robert C. Angell, Prince Bay, N. Y., assignor to The S. S. White Dental Manufacturing Company, a corporation of Pennsylvania Application August 3, 1940, Serial No. 350,771

5 Claims. (Cl. 128—229)

My invention relates particularly to that class of devices that are employed to warm the fluid to be ejected from a syringe such as is generally employed by the dental profession to flush out the cavities of teeth, and is especially directed to a system whereby the flow of warm fluid may be prolonged, and is a continuation in part of my application Serial No. 266,174, filed April 5, 1939.

The principal objects of my invention are to provide a heated holder for a warm water syringe having a substantial fluid reservoir contained within the syringe handle whereby the fluid contained in said syringe may be warmed by induction from said heated holder.

Other objects of my invention are to provide a warm water syringe with means connected with a source of water supply through a water heating reservoir remote from said syringe but with which it may be connected by a substantial length of flexible tubing sufficient to permit the syringe to be withdrawn from its heated holder for convenient use in treating a patient.

My invention further includes a syringe having its connecting flexible tubing of relatively small bore diameter, sheathed by an outer tubing serving as a heat insulator for the fluid conveying inner tubing, and both said tubings being connected with said water heating reservoir and syringe through connectors each having relatively coaxial nipples to which said inner and outer tubings may be conveniently connected in substantially concentric relation.

My invention also includes such an arrangement of the syringe, its heated holder and water heated reservoir, that the water in the reservoir in the syringe handle is tempered by the water contained in the tubing, which is followed by the warmed water in the heated reservoir, so that water exuding from the syringe nozzle will be of substantially constant temperature.

Specifically stated, the form of my invention as hereinafter more definitely described comprises a cylindrical holder for the syringe and is composed of concentric tubing with an interposed heating element, conveniently mounted on the cuspidor supporting arm of a dental equipment unit, and through which said syringe extends when not in use in connected relation through flexible tubing with a heated water reservoir which is connected with a source of water supply.

My invention also includes all of the various novel features of construction and arrangement as hereinafter more definitely specified.

In the accompanying drawing, Figure 1 is a side elevational view of a cuspidor supporting arm upon which the syringe and its heated holder is conveniently mounted, said cuspidor supporting arm being rotatably supported upon an equipment standard of which a fragment only is illustrated for simplification of illustration; Fig. 2 is a vertical longitudinal sectional view of the syringe holder and a fragment of the supporting arm illustrated in Fig. 1; and Fig. 3 is an enlarged side elevational view of the syringe shown in Fig. 1 with a portion including its handle and hose-pipe connections being shown in section for convenience of illustration.

In said figures, the cuspidor supporting arm 1 is mounted to rotate about the axis of the equipment supporting standard 2, and carries the cuspidor 3, and the warm water syringe holder 5 which normally supports the syringe 6 when not in use.

The handle portion 7 of said syringe 6 depends into the bore of the syringe holder 5 and is connected by the flexible hose-pipe 9, disposed in the loop 10, with the valve 12 having the controlling knob 13 and which valve is connected by the pipe 15 with the water heater 16.

Said water heater 16 is connected by the pipe 17, fitting 19, and flexible tubing 20 with a suitable source of water supply, and embodies the electric heating unit 22 having the electric current conducting lead-in wires 23 and 25 connecting it to a suitable source of electric power.

As shown in section in Fig. 2, the syringe holder 5 comprises the outer cylindrical shell 26, having the base 27 mounted on the top wall of the cuspidor supporting arm 1 and having the syringe supporting bushing 29 from which depends the concentric inner tubular casing 30 of said syringe holder 5.

The syringe holder 5 is provided with the heating element 32 preferably in the form of a spirally coiled wire disposed in the annular space 33 between the shell 26 and the tubular casing 30 and connected through the insulated screws 36 and 37, in the cuspidor supporting arm frame 39 and the lead-in wires 40 and 41 with a suitable source of electric current supply.

As shown in Fig. 3, the syringe comprises the valve housing 50, having the valve controlling thumb actuated lever 49, dispensing nozzle 51 and handle 52 which includes a water reservoir 53 of substantial volume which is connected through the connector 55 and dual hose-pipes 9 and 56 with the valve 12.

It may be here noted that the hose-pipe 56 is of small bore diameter and is adapted to convey the warmed water from the water heater 16 to the reservoir 53 in the handle 52, while the outer hose-pipe tubing 9 is provided to heat insulate the hose-pipe 56 and thereby conserve the heat of the water passing therethrough from the water heater 16.

Referring again to Fig. 3, the connector 55 is provided with the relatively coaxial nipples 59 and 60, the hose-pipe tubing 9 being attached to the nipple 59 by wrapped ligatures 61, and the hose-pipe 56 being attached to the nipple 60 by wrapped ligatures 62.

My invention is advantageous in that the water in the reservoir of the handle of the syringe is heated by induction from the heated holder while the syringe is not in use so that when said syringe is withdrawn from said holder for use, and the thumb actuated lever depressed to open the valve in the valve housing, the warm water in the reservoir 53 will be tempered by the cooler water in the hose-pipe 56 until the warmed water in the water heater 16 reaches the syringe reservoir to continue the warm water flow through the syringe.

I do not desire to limit my invention to the precise details of construction and arrangement as herein set forth, as it is obvious that various modifications may be made therein without departing from the essential features of my invention as defined in the appended claims.

Having thus described my invention, I claim:

1. A heating system for warm water syringes comprising a heater holder in which the syringe is supported when not in use, and a water heater remote from said heated holder with which said syringe is connected by flexible hose-pipe.

2. A heating system for warm water syringes comprising a heated holder in which the syringe having a reservoir in its handle is supported when not in use, a water heater disposed remote from said heated holder, and a flexible hose-pipe connecting said water heater and syringe whereby water is conveyed from said water heater to said syringe through said heated holder.

3. The combination with a heated holder for a syringe when not in use, of a syringe having a water reservoir in its handle removably supported in said holder, a water heater, a valve controlled outlet for said water heater, a hose-pipe connection between said water heater outlet and syringe, permitting withdrawal of said syringe from said holder while connected with said water heater.

4. The combination with a heated holder for a syringe when not in use, of a syringe having a water reservoir in its handle removably supported in said holder, a water heater, a valve controlled outlet for said water heater, a hose-pipe connection between said water heater outlet and syringe, permitting withdrawal of said syringe from said holder while connected with said water heater, and a thumb actuated valve in said syringe.

5. The combination with a heated holder for a syringe when not in use, of a syringe having a water reservoir in its handle removably supported in said holder, a water heater, a valve controlled outlet for said water heater, a dual hose-pipe connection between said water heater outlet and syringe, permitting withdrawal of said syringe from said holder while connected with said water heater.

ROBERT C. ANGELL.